(12) United States Patent
Li et al.

(10) Patent No.: US 11,041,467 B2
(45) Date of Patent: Jun. 22, 2021

(54) BACKFLOW PREVENTER AND ENGINE EGR SYSTEM

(71) Applicant: WEICHAI POWER CO., LTD., Shandong (CN)

(72) Inventors: Wei Li, Shandong (CN); Junlong Liu, Shandong (CN); Zhijie Li, Shandong (CN); Jie Pan, Shandong (CN); Zuofeng Wang, Shandong (CN); Chuntao Liu, Shandong (CN); Tianqin Kang, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 16/753,579

(22) PCT Filed: Dec. 27, 2017

(86) PCT No.: PCT/CN2017/118997
§ 371 (c)(1),
(2) Date: Apr. 3, 2020

(87) PCT Pub. No.: WO2019/127099
PCT Pub. Date: Jul. 4, 2019

(65) Prior Publication Data
US 2020/0318580 A1    Oct. 8, 2020

(51) Int. Cl.
*F02M 26/17*    (2016.01)
(52) U.S. Cl.
CPC .................................. *F02M 26/17* (2016.02)
(58) Field of Classification Search
CPC .............................. F02M 26/17; F02M 26/13
See application file for complete search history.

(56) References Cited

U.S. PATENT DOCUMENTS

2011/0232615 A1*  9/2011  Perr ..................... F02M 26/13
                                                    123/568.26
2016/0237928 A1*  8/2016  Lana ................... F02D 41/0007
(Continued)

FOREIGN PATENT DOCUMENTS

CN      201461146 A     5/2010
CN      102906377 A     1/2013
(Continued)

OTHER PUBLICATIONS

International Search Report for International Application PCT/CN2017/118997; dated Sep. 30, 2018.

*Primary Examiner* — Xiao En Mo
(74) *Attorney, Agent, or Firm* — Cantor Colburn LLP (57) ABSTRACT

A backflow preventer, including one or multiple reducing rings that are disposed in a pipeline; the outer edges of the reducing rings are connected to the inner wall of the pipeline; the multiple reducing rings are arranged along the axis of the pipeline; and the actual internal area of the reducing rings are gradually decreased in the axial direction of the reducing rings. Further disclosed is an engine EGR system including the backflow preventer. The backflow preventer can generate, according to different flowing directions in a pipeline, throttling losses of different degrees; when an air flows in a direction (forward direction) in which the actual internal area of the reducing rings decreases, the throttling loss is small; and when then air flows in a direction (reverse direction) in which the actual internal area of the reducing rings increases, the throttling loss is large.

11 Claims, 5 Drawing Sheets

(56) References Cited

U.S. PATENT DOCUMENTS

2017/0284342 A1* 10/2017 Terai .................. F02M 26/44
2017/0306899 A1* 10/2017 Sanami ................ F02M 26/17

FOREIGN PATENT DOCUMENTS

| CN | 105822463 A | 8/2016 |
| CN | 108180090 A | 6/2018 |
| JP | 2007085248 A | 4/2007 |
| JP | 2010144700 A | 7/2010 |

* cited by examiner

BACKFLOW PREVENTER AND ENGINE EGR SYSTEM

CROSS REFERENCE TO RELATED APPLICATIONS

This is the U.S. national stage of application No PCT/CN2017/118997, titled "BACKFLOW PREVENTER AND ENGINE EGR SYSTEM", filed on Dec. 27, 2017, the disclosure of which is incorporated herein by reference.

FIELD

The present application relates to the technical field of engine exhaust gas recirculation, and in particular to a backflow preventer. The present application further relates to an engine EGR system including the backflow preventer.

BACKGROUND

EGR (short for Exhaust Gas Recirculation) technology is a technology of re-introducing part of the exhaust gas after combustion into the engine cylinder for re-combustion. This technology can reduce nitrogen oxides (NOx) in the exhaust gas and improves fuel economy.

The existing engine EGR system mainly includes an engine, a supercharger, an EGR cooler, and an EGR pipeline. Two ends of the EGR pipeline are respectively in communication with a front pipeline of the turbo of the supercharger and an intake pipeline of the engine. The EGR cooler is arranged in the EGR pipeline. There are exhaust pulses in the engine. During a complete cycle of the engine, each cylinder of the engine successively completes the exhaust process, forming an exhaust pressure wave. The periodic pressure fluctuation is the exhaust pulse. The front pressure of the turbo at the peak of the exhaust pressure wave is higher than the intake pressure of the engine. Under the effect of the exhaust pulse, the EGR pipeline draws the exhaust gas from the front pipeline of the turbo, the exhaust gas passes through the EGR pipeline and the EGR cooler and then enters the intake pipeline of the engine, and finally enters the cylinders of the engine. Therefore, a certain EGR rate (a ratio of the amount of exhaust gas recirculated to the total amount of the intake gas drawn into the cylinder) can be reached by means of the exhaust pulses. Even with a small intake-exhaust pressure difference, a relatively high EGR rate can be reached by means of the exhaust pulses.

However, due to the inherent characteristics of the engine and the supercharger, when the engine is in a low-speed high-torque working condition, the intake pressure of the engine is higher than the front pressure of the turbo, and the gas in the intake pipe of the engine may even return to the front pipeline of the turbo through the EGR pipeline, which hardly realizes EGR. In addition, the existing arrangements of the EGR system mostly are that the EGR pipeline includes two or more EGR gas intake pipes, one end of each EGR gas intake pipe is in communication with one or more engine cylinder, and another end of each EGR gas intake pipe is in communication with the EGR main pipeline after confluence. The problem with this arrangement is that, when one of the EGR gas intake pipes conducts the exhaust gas recirculation, the exhaust gas will flow back into the other EGR gas intake pipes, lowering the EGR rate.

In summary, a problem to be urgently solved by those skilled in the art is how to solve the problem of gas backflow in the EGR pipeline.

It is also a problem to be urgently solved by those skilled in the art that the EGR rate of the engine EGR system is low and the system cannot even realize EGR.

SUMMARY

In view of this, an object of the present application is to provide a backflow preventer to prevent gas from flowing back in the pipeline.

Another object of the present application is to provide an engine EGR system including the backflow preventer to prevent gas from flowing back in the EGR pipeline, realize exhaust gas recirculation under low-speed high-torque working conditions of the engine, and improve the EGR rate under other working conditions.

Yet another object of the present application is to provide an engine EGR system including the backflow preventer to prevent gas from flowing back in the EGR gas intake pipe, realize exhaust gas recirculation under low-speed high-torque working conditions of the engine, and improve the EGR rate under other working conditions.

To achieve the above objects, the following technical solutions are provided according to the present application:

a backflow preventer includes one or more tapered ring provided in a pipeline, an outer edge of the tapered ring is connected to an inner wall of the pipeline, and multiple tapered rings are arranged along an axial direction of the pipeline, and a flow section of the tapered ring gradually tapers along an axial direction of the tapered ring.

Preferably, in the backflow preventer, the tapered ring is a non-closed tapered ring with a gap.

Preferably, in the backflow preventer, the tapered ring is made of elastic metal.

Preferably, in the backflow preventer, the outer edge of the tapered ring is engaged with a groove on the inner wall of the pipeline.

Preferably, in the backflow preventer, one surface of the groove close to a small-hole end of the tapered ring is an arc-shaped transition surface, and another surface of the groove close to a large-hole end of the tapered ring is a right-angle positioning surface.

Preferably, in the backflow preventer, a distance between each two adjacent tapered rings is greater than or equal to an axial length of the tapered ring.

Preferably, the backflow preventer further includes an insertion sheet inserted in the multiple tapered rings, and a length of the insertion sheet is greater than or equal to a total length of the arrangement of the tapered rings.

An engine EGR system is further provided according to the present application, which includes an engine, an EGR pipeline, and an EGR cooler. Two ends of the EGR pipeline are respectively in communication with an intake pipeline of the engine and a cylinder of the engine. The EGR cooler is arranged in the EGR pipeline. A pipe section of the EGR pipeline ahead of the EGR cooler is further provided with the backflow preventer according to any one of the above aspects, and the flow section of the tapered ring of the backflow preventer gradually tapers along a forward movement direction of the gas in the EGR pipeline.

Preferably, the engine EGR system further includes an EGR valve provided in the EGR pipeline.

Another engine EGR system is further provided according to the present application, which includes an engine, an EGR pipeline, and an EGR cooler. The EGR pipeline includes an EGR main pipeline and multiple EGR gas intake pipes. The multiple EGR gas intake pipes are in communication with a cylinder of the engine. Two ends of the EGR main pipeline are respectively in communication with the multiple EGR gas intake pipes and an intake pipeline of the engine. The EGR cooler is provided in the EGR main pipeline. Each of the EGR gas intake pipes is provided with the backflow preventer according to any one of the above aspects.

Preferably, in the engine EGR system, a pipe section of the EGR main pipeline ahead of the EGR cooler is further provided with the backflow preventer.

Preferably, in the engine EGR system, the backflow preventer in the EGR main pipeline further includes an insertion sheet, the insertion sheet is inserted into multiple tapered rings of the backflow preventer, a length of the insertion sheet is greater than or equal to a total length of the arrangement of the tapered rings, and the insertion sheet is extended to an intersection of the EGR gas intake pipes.

Preferably, the engine EGR system further includes an EGR valve provided in the EGR main pipeline.

Compared with the conventional technology, the present application has the following beneficial effects.

The backflow preventer provided according to the present application includes one or more tapered rings arranged in the pipeline, and the flow section of the tapered ring gradually tapers along the axial direction of the tapered ring. The backflow preventer can generate different degrees of throttling loss according to different flow directions of the gas in the pipe. In a case that the gas flows in a direction (forward direction) in which the flow section of the tapered ring gradually tapers, the throttling loss is small; and in a case that the gas flows in a direction (reverse direction) in which the flow section of the tapered ring enlarges, the throttling loss is large. Therefore, the tapered ring can inhibit the reverse flow and promote the forward flow while there is reciprocating flow in the pipe, thereby preventing the gas from flowing back in the pipeline.

The engine EGR system provided according to the present application is provided with the backflow preventer in the EGR pipeline. The flow section of the tapered ring of the backflow preventer gradually tapers along the forward movement direction of the gas in the EGR pipeline. The tapered ring can prevent the gas from flowing back in the EGR pipeline, thereby realizing exhaust gas recirculation under low-speed high-torque working conditions of the engine, and improving the EGR rate under other working conditions.

Another engine EGR system provided according to the present application is provided with the backflow preventers in the EGR gas intake pipes. The flow section of the tapered ring of the backflow preventer gradually tapers along the forward movement direction of the gas in the EGR gas intake pipe. The tapered ring can prevent the gas from flowing back in the EGR gas intake pipe, thereby realizing exhaust gas recirculation under low-speed high-torque working conditions of the engine, and improving the EGR rate under other working conditions.

BRIEF DESCRIPTION OF THE DRAWINGS

In order to more clearly describe the embodiments of the present application or the technical solutions in the conventional technology, the drawings referred to for describing the embodiments or the conventional technology will be briefly described below. Apparently, the drawings in the following description are merely embodiments of the present application. For those of ordinary skill in the art, other drawings may be obtained according to the provided drawings without creative efforts.

Reference numerals are listed as follows:

| | |
|---|---|
| 1 engine, | 2 EGR valve, |
| 3 intercooler, | 4 EGR cooler, |
| 5 EGR main pipeline, | 6 backflow preventer, |
| 7 first EGR gas intake pipe, | 8 second EGR gas intake pipe, |
| 11 turbo, | 10 compressor, |
| 11 pipeline, | 12 EGR pipeline; |
| 61 tapered ring, | 611 gap, |
| 62 insertion sheet, | 111 groove. |

DETAILED DESCRIPTION OF THE EMBODIMENTS

The core of the present application is to provide a backflow preventer, which can prevent gas from flowing back in the pipeline.

An engine EGR system including the backflow preventer is further provided according to the present application, which can prevent gas from flowing back in the EGR pipeline, realize exhaust gas recirculation under low-speed high-torque working conditions of the engine, and improve the EGR rate under other working conditions.

Another engine EGR system including the backflow preventer is further provided according to the present application, which can prevent gas from flowing back in the EGR gas intake pipe, realize exhaust gas recirculation under low-speed high-torque working conditions of the engine, and improve the EGR rate under other working conditions.

The technical solutions in the embodiments of the present application will be clearly and completely described in the following with reference to the drawings in the embodiments of the present application. Apparently, the described embodiments are only a part of the embodiments of the present application, rather than all the embodiments. Based on the embodiments of the present application, all other embodiments obtained without creative efforts by those of ordinary skill in the art shall fall within the protection scope of the present application.

Referring to FIGS. 1 to 5, a backflow preventer 6 is provided according to an embodiment of the present application, which includes one or more tapered ring 61 provided in a pipeline 11. An outer edge of the tapered ring 61 is connected to an inner wall of the pipeline 11. In a case that multiple tapered rings 61 are provided, the multiple tapered rings 61 are arranged along an axial direction of the pipeline 11, and a flow section of the tapered ring 61 gradually tapers along an axial direction of the tapered ring 61. The structure of the tapered ring 61 is similar to a horn.

The backflow preventer 6 can generate different degrees of throttling loss according to different flow directions of the gas in the pipeline 11. In a case that the gas flows in a direction (forward direction) in which the flow section of the tapered ring 61 gradually tapers, the throttling loss is small; and in a case that the gas flows in a direction (reverse direction) in which the flow section of the tapered ring 61 enlarges, the throttling loss is large. Therefore, the tapered ring 61 can inhibit the reverse flow and promote the forward flow while there is reciprocating flow in the pipe, thereby preventing the gas from flowing back in the pipeline 11.

Figure 1:
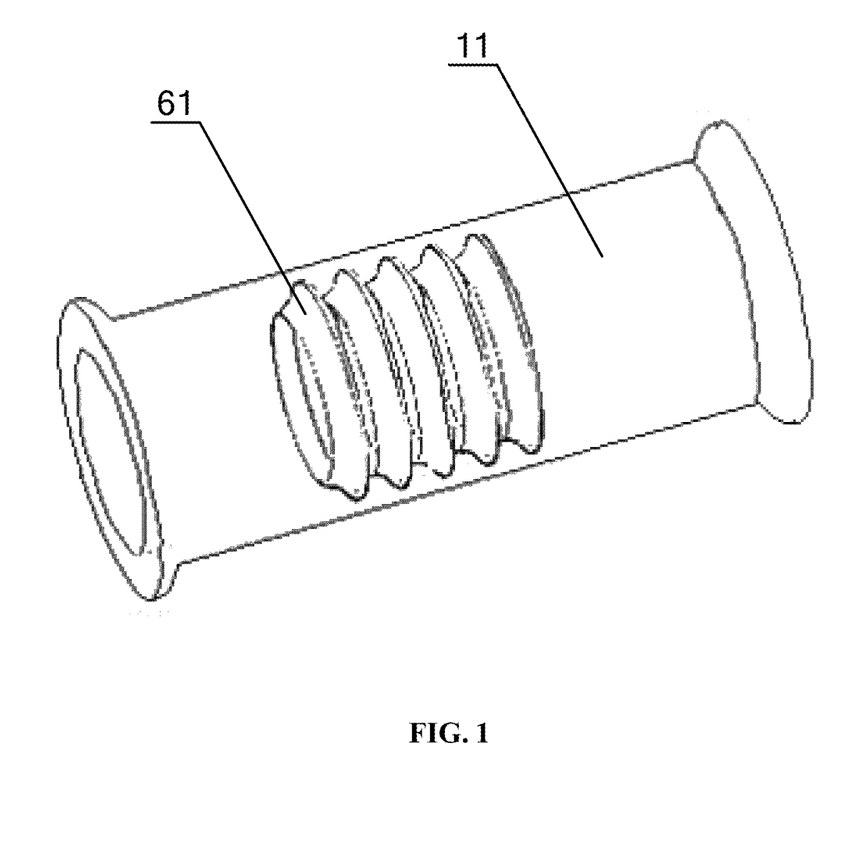
FIG. 1 is a schematic view showing the installation of a backflow preventer according to an embodiment of the present application.
Figure 2:
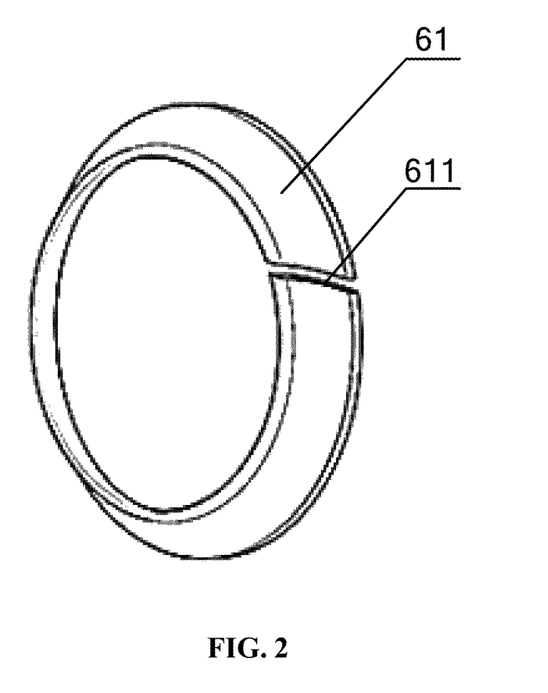
FIG. 2 is a schematic structural view of a tapered ring of the backflow preventer according to an embodiment of the present application.
Figure 3:
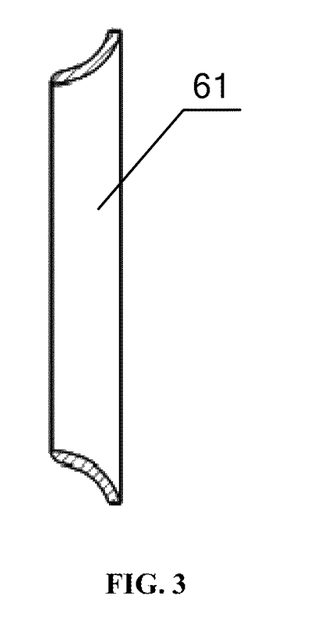
FIG. 3 is schematic sectional view of the tapered ring shown in FIG. 2.

As shown in FIG. 2, further, in this embodiment, the tapered ring 61 is a non-closed tapered ring with a gap 611. The tapered ring 61 is provided with the gap 611. If the pipe diameter of the pipeline 11 changes slightly due to thermal expansion and contraction, the size of the tapered ring is adaptively adjusted by the gap 611 of the tapered ring 61 to prevent the tapered ring 61 from fracture due to different deformation from the pipeline 11. Apparently, the tapered ring 61 may be a closed tapered ring. As long as the material of the tapered ring 61 can adapt to the change in stress, the gap 611 may not be provided.

Furthermore, in this embodiment, the tapered ring 61 is an elastic metal tapered ring. The elastic metal tapered ring has the advantages of good elasticity and high temperature resistance, and can be arranged in the pipeline 11 having a relatively high temperature. Apparently, according to the nature of the fluid in the pipeline 11, other materials may be selected, such as plastic.

Figure 4:
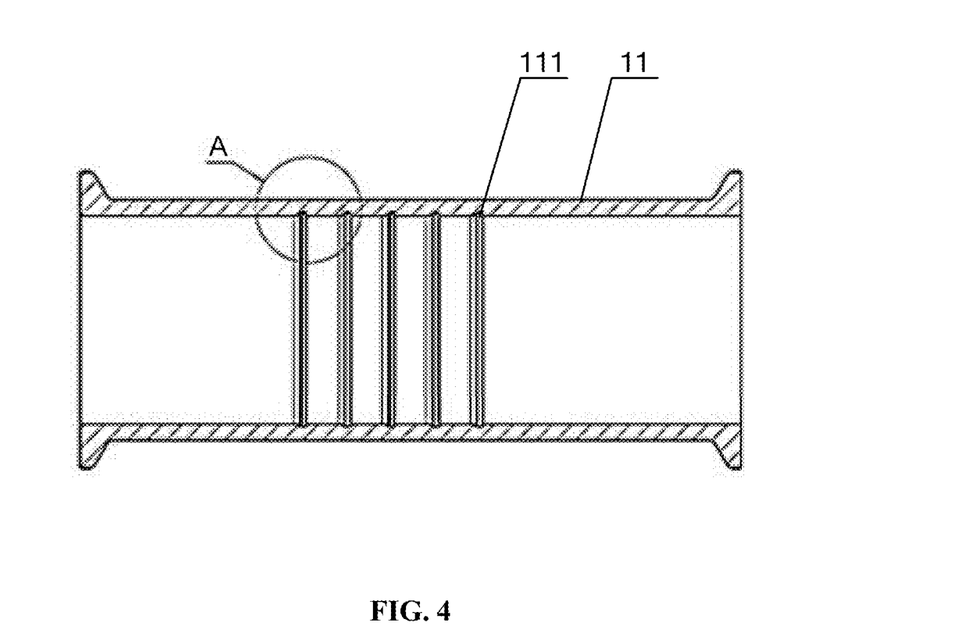
FIG. 4 is a schematic view showing the installation structure of a backflow preventer according to an embodiment of the present application.
Figure 5:
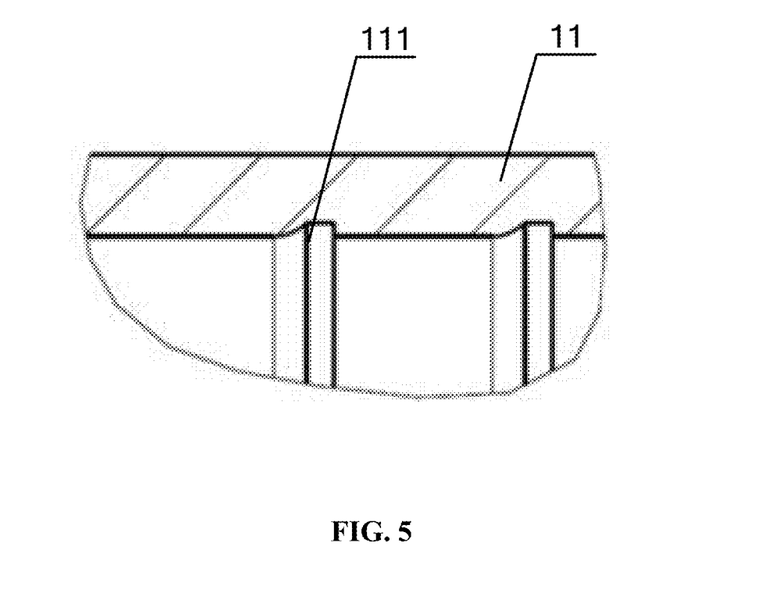
FIG. 5 is a partially enlarged schematic view of part A in FIG. 4.

As shown in FIGS. 4 and 5, in this embodiment, the outer edge of the tapered ring 61 is engaged with a groove 111 on the inner wall of the pipeline 11. During installation, the multiple tapered rings 61 are pushed into the pipeline 11 one by one, and are pushed into the grooves 111 for positioning and fixing, which is convenient for installation. Apparently, the tapered ring 61 may be fixed to the inner wall of the pipeline 11 by welding or bonding.

Further, one surface of the groove 111 close to a smallhole end of the tapered ring 61 is an arc-shaped transition surface, and another surface of the groove 111 close to a large-hole end of the tapered ring 61 is a right-angle positioning surface. During installation, the tapered ring 61 is pushed into the pipeline 11, the outer edge of the tapered ring 61 is pushed into the groove 111 from the side of the arc-shaped transition surface of the groove 111, and the outer edge of the tapered ring 61 is axially positioned by the right-angle positioning surface of the groove 111. During disassembly, the tapered ring 61 is removed from the side of the arc-shaped transition surface of the groove 111, and the arc-shaped transition surface can facilitate the installation and disassembly of the tapered ring 61.

In this embodiment, a distance between each two adjacent tapered rings 61 is greater than or equal to an axial length of the tapered ring 61, that is, a distance between two adjacent grooves 111 is greater than or equal to twice the axial length of one single tapered ring 61. Such an arrangement can improve the backflow prevention effect of the tapered ring on the fluid.

The greater the number of tapered rings 61, the more obvious the backflow prevention effect, but the greater the throttling loss of the pipeline 11. Therefore, the number of the tapered rings 61 needs to be reasonably selected according to the pressure level of the pipeline 11 and the backflow degree of the gas.

Figure 7:
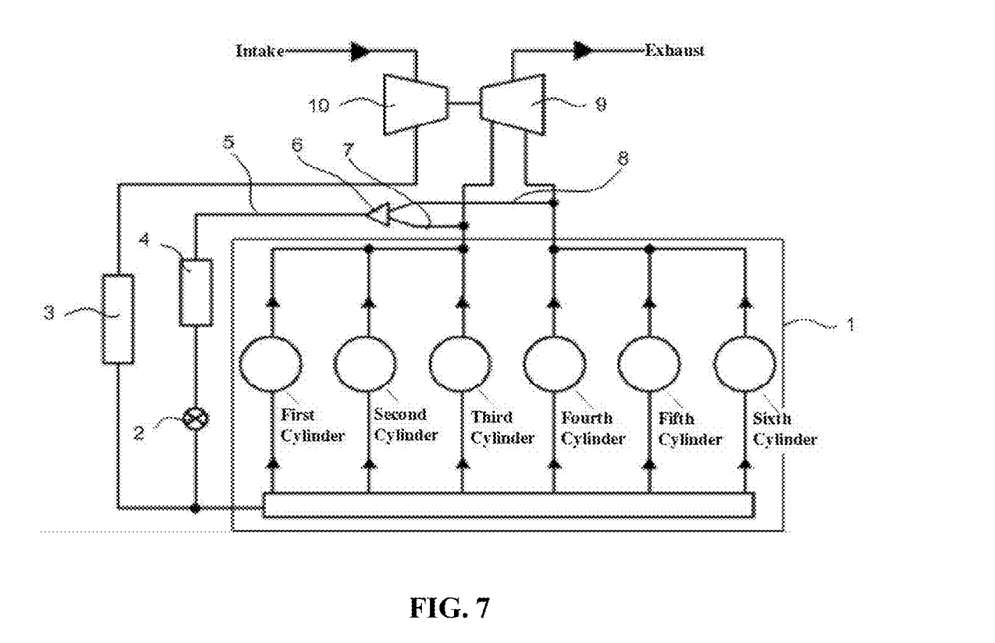
FIG. 7 is a schematic view showing the connection of another engine EGR system according to an embodiment of the present application.
Figure 8:
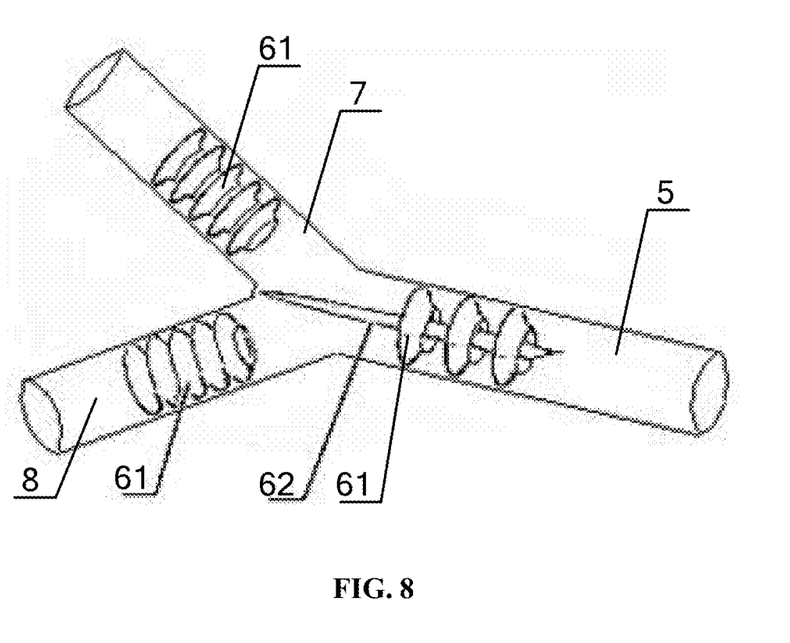
FIG. 8 is a schematic view showing an arrangement of the backflow preventer in an engine EGR system according to an embodiment of the present application.

As shown in FIGS. 7 and 8, in this embodiment, the backflow preventer 6 further includes an insertion sheet 62 inserted in the multiple tapered rings 61, a length of the insertion sheet 62 is greater than or equal to a total length of the arrangement of the tapered rings 61, and two ends of the insertion sheet 62 extend beyond the two outermost tapered rings 61. By inserting the insertion sheet 62 into the tapered rings 61, the backflow preventer 6 has a more significant backflow prevention effect on the pipeline 11, and the backflow prevention effect is better.

Figure 6:
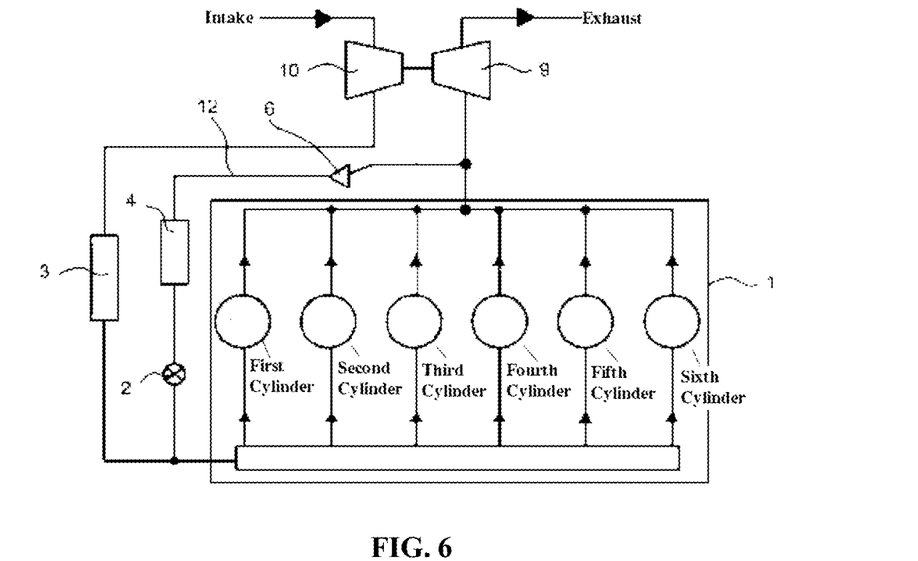
FIG. 6 is a schematic view showing the connection of an engine EGR system according to an embodiment of the present application.

As shown in FIG. 6, based on the backflow preventer 6 described in any of the above embodiments, an engine EGR system is further provided according to an embodiment of the present application, which includes an engine 1, an EGR pipeline 12, an EGR cooler 4, a supercharger, and an intercooler 3. Two ends of the EGR pipeline 12 are respectively in communication with an intake pipeline of the engine 1 and a cylinder of the engine 1. The EGR cooler 4 is arranged in the EGR pipeline 12. A turbo 9 of the supercharger is in communication with the cylinder of the engine 1. The EGR pipeline 12 takes gas from the front pipeline of the turbo. A compressor 10 of the supercharger is in communication with the intake pipeline of engine 1. The intercooler 3 is arranged in a rear pipeline of the compressor. The engine EGR system further includes the backflow preventer 6 as described in any one of the above embodiments. The backflow preventer 6 is arranged in a pipe section of the EGR pipeline 12 ahead of the EGR cooler 4, and the flow section of the tapered ring 61 of the backflow preventer 6 gradually tapers along the forward movement direction of the gas in the EGR pipeline 12, that is, the flow section of the tapered ring 61 gradually tapers along the cylinder of the engine 1 toward the EGR cooler 4.

The working principle and working process of the engine EGR system are as follows. During high-speed working conditions of the engine 1, the front exhaust pressure of the turbo is greater than the intake pressure of the engine, part of the exhaust gas from the cylinder of the engine 1 enters the EGR pipeline 12, and enters the intake pipeline of the engine 1 through the backflow preventer 6 and the EGR cooler 4 in sequence, and the exhaust gas is mixed with the fresh gas entering from the compressor 10 and enters the cylinder of the engine 1 to realize exhaust gas recirculation. Since the backflow preventer 6 is provided in the EGR pipeline 12, the forward flow of the exhaust gas is promoted, thereby improving the EGR rate. While the engine 1 is in low-speed high-torque conditions, fresh gas enters the intake pipeline of the engine 1 through the compressor 10 and the intercooler 3, the intake pressure of the engine is greater than the front exhaust pressure of the turbo, and the gas flows back through the EGR pipeline 12. Since the backflow preventer 6 is provided in the EGR pipeline 12, the backflow of the exhaust gas is inhibited by the backflow preventer 6, thereby ensuring successful realization of exhaust gas recirculation.

In this embodiment, the engine EGR system further includes an EGR valve 2 provided in the EGR pipeline 12. The on/off of the EGR pipeline 12 is controlled by the EGR valve 2. When exhaust gas recirculation is required, the EGR valve 2 is opened. When exhaust gas recirculation is not required, the EGR valve 2 is closed.

Figure 9:
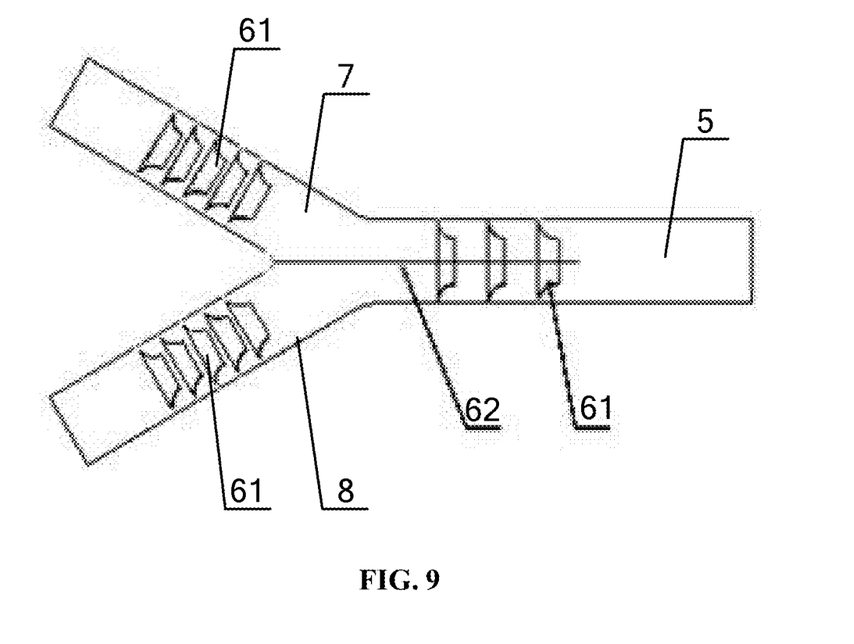
FIG. 9 is a front view of the arrangement of the backflow preventer in the engine EGR system according to an embodiment of the present application.

As shown in FIGS. 7 and 9, another engine EGR system is further provided according to an embodiment of the present application, which includes an engine 1, an EGR pipeline, an EGR cooler 4, a supercharger, and an intercooler 3. The EGR pipeline includes an EGR main pipeline 5 and multiple EGR gas intake pipes, each of the multiple EGR gas intake pipes is in communication with one or more cylinder of the engine 1, these EGR gas intake pipes intersect and communicate with one end of the EGR main pipeline 5, and another end of the EGR main pipeline 5 is in communication with the intake pipeline of engine 1. The EGR cooler 4 is provided in the EGR main pipeline 5. The turbo 9 of the supercharger is in communication with the cylinders of the engine 1. The number of the front pipelines of the turbo is the same as the number of EGR gas intake pipes. Each of the multiple EGR gas intake pipes is correspondingly in communication with one front pipeline of the turbo, and the EGR gas intake pipe draws gas from the front pipeline of the turbo. The compressor 10 of the supercharger is in communication with the intake pipeline of the engine 1. The intercooler 3 is arranged in a rear pipeline of the compressor. The engine EGR system in the embodiment further includes the backflow preventer 6 as described in any one of the above embodiments. The backflow preventer 6 is arranged in each EGR gas intake pipe, and the flow section of the tapered ring 61 of the backflow preventer 6 gradually tapers along the forward movement direction of the gas in the EGR gas intake pipe, that is, the flow section of the tapered ring 61 of the backflow preventer 6 gradually tapers along the EGR gas intake pipe toward the EGR main pipeline 5.

For a six-cylinder engine, the EGR pipeline preferably uses two EGR gas intake pipes, namely a first EGR gas intake pipe 7 and a second EGR gas intake pipe 8. The first EGR gas intake pipe 7 is in communication with first, second and third cylinders of the engine 1. The second EGR gas intake pipe 8 is in communication with the fourth, fifth and sixth cylinders of the engine 1. The first EGR gas intake pipe 7 and the second EGR gas intake pipe 8 are intersected with each other, and communicate with the EGR main pipeline 5. Apparently, the EGR pipeline may further include three, four, and more EGR gas intake pipes, and the cylinder grouping of the engine 1 is not limited to the grouping form described in this embodiment.

Taking that the EGR pipeline has two EGR gas intake pipes as an example, the working principle and working process of the engine EGR system are as follows. Due to the ignition interval, the first, second and third cylinders and the fourth, fifth, and sixth cylinders alternately exhaust. For example, under high-speed conditions of the engine 1, when the exhaust of the fourth, fifth and sixth cylinders ends, the exhaust of the first, second and third cylinders begins, and the pressure in the first EGR gas intake pipe 7 which is in communication with the first, second, and third cylinders is higher than the rear pressure of the compressor and the pressure in the second EGR gas intake pipe 8 which is in communication with the fourth, fifth and sixth cylinders. Therefore, the exhaust gas flows from the first EGR gas intake pipe 7 to the EGR main pipeline 5 and the second EGR gas intake pipe 8. Among them, the exhaust gas flowing to the EGR main pipeline 5 realizes exhaust gas recirculation. The exhaust gas flowing to the second EGR gas intake pipe 8 cause exhaust gas loss in the first EGR gas intake pipe 7, reducing the EGR rate of the first, second and third cylinders. Therefore, backflow preventers 6 are provided in both the first EGR gas intake pipe 7 and the second EGR gas intake pipe 8 to prevent the gas in the first EGR gas intake pipe 7 from flowing back into the second EGR gas intake pipe 8, thereby avoiding the exhaust gas loss in the first EGR intake pipe 7 and improving the EGR rate of the cylinders on this side. While the second EGR gas intake pipe 8 draws air from the cylinders, the exhaust gas in the second EGR gas intake pipe 8 will not flow back into the first EGR gas intake pipe 7, thereby preventing the exhaust gas loss in the second EGR gas intake pipe 8 and improving the EGR rate of the fourth, fifth and sixth cylinders.

When the engine 1 is in low-speed and high-torque conditions, fresh gas enters the intake pipeline of the engine 1 through the compressor 10 and the intercooler 3, and the engine intake pressure is greater than the front exhaust pressure of the turbo, which may result in a phenomenon in which the exhaust gas flows back to the EGR gas intake pipe from the EGR main pipeline 5 and the EGR may even not be realized. Therefore, providing the backflow preventer 6 in the EGR gas intake pipe can prevent the gas from flowing back into the EGR gas intake pipe, ensuring the successful realization of exhaust gas recirculation. In addition, the backflow preventer 6 in the EGR gas intake pipe can promote the forward flow of the gas, thereby improving the EGR rate.

It can be seen that, the backflow preventer 6 can effectively reduce the backflow of exhaust gas from the EGR main pipeline 5 to the EGR gas intake pipe and the mutual backflow between the multiple EGR gas intake pipes.

As shown in FIGS. 8 and 9, furthermore, in this embodiment, the backflow preventer 6 is also provided in a pipe section of the EGR main pipeline 5 ahead of the EGR cooler 3, so as to further prevent the gas in the EGR main pipeline 5 from flowing back into the EGR gas intake pipe.

Further, the backflow preventer 6 provided in the EGR main pipeline 5 further includes an insertion sheet 62, which is inserted into the multiple tapered rings 61 of the backflow preventer 6. A length of the insertion sheet 62 is greater than or equal to a total length of the arrangement of the multiple tapered rings 61, and the insertion sheet 62 is extended to an intersection of the EGR gas intake pipes to prevent the gas from mutual backflow among the multiple EGR gas intake pipes. By inserting the insertion sheet 62 in the tapered rings 61, the backflow prevention effect of the backflow preventer 6 on the gas in the EGR main pipeline 5 can be further strengthened, and the mutual flow among the multiple EGR gas intake pipes can be effectively reduced.

The greater the number of tapered rings 61, the more obvious the backflow prevention effect, but the greater the throttling loss of the pipeline. Therefore, the number of the tapered rings 61 needs to be reasonably selected according to the pressure level of the EGR pipeline and the backflow degree of the gas.

In this embodiment, the engine EGR system further includes an EGR valve 2 provided in the EGR main pipeline 5. The on/off of the EGR main pipeline 5 is controlled by the EGR valve 2. When exhaust gas recirculation is required, the EGR valve 2 is opened. When exhaust gas recirculation is not required, the EGR valve 2 is closed.

The embodiments in this specification are described in a progressive manner. Each embodiment focuses on the differences from other embodiments. For the same or similar parts among the embodiments, reference may be made to each other.

According to the above description of the disclosed embodiments, those skilled in the art can implement or practice the present application. Various modifications to these embodiments will be apparent to those skilled in the art, and the general principles defined herein may be implemented in other embodiments without departing from the spirit or scope of the present application. Therefore, the present application shall not be limited to the embodiments shown herein, but shall conform to the widest scope consistent with the principles and novel features disclosed herein.

The invention claimed is:

1. A backflow preventer, comprising a plurality of tapered rings provided in a pipeline and an insertion sheet inserted in the plurality of the tapered rings, wherein an outer edge of each of the plurality of tapered rings is connected to an inner wall of the pipeline, the plurality of tapered rings is arranged along an axial direction of the pipeline, and a flow section of each tapered ring gradually tapers along an axial direction of the tapered ring,
wherein a length of the insertion sheet is greater than or equal to a total length of an arrangement of the tapered rings.

2. The backflow preventer according to claim 1, wherein the tapered ring is a non-closed tapered ring with a gap.

3. The backflow preventer according to claim 2, wherein the tapered ring is made of elastic metal.

4. The backflow preventer according to claim 1, wherein the outer edge of the tapered ring is engaged with a groove on the inner wall of the pipeline.

5. The backflow preventer according to claim 4, wherein one surface of the groove close to a small-hole end of the tapered ring is an arc-shaped transition surface, and another surface of the groove close to a large-hole end of the tapered ring is a right-angle positioning surface.

6. The backflow preventer according to claim 1, wherein a distance between each two adjacent tapered rings is greater than or equal to an axial length of the tapered ring.

7. An engine EGR system, comprising an engine, an EGR pipeline, and an EGR cooler, wherein two ends of the EGR pipeline are respectively in communication with an intake pipeline of the engine and a cylinder of the engine, the EGR cooler is arranged in the EGR pipeline, a pipe section of the EGR pipeline ahead of the EGR cooler is further provided with a backflow preventer, the backflow preventer comprises a plurality of tapered rings provided in a pipeline and an insertion sheet inserted in the plurality of the tapered rings, an outer edge of each of the plurality of tapered rings is connected to an inner wall of the pipeline, the plurality of tapered rings is arranged along an axial direction of the pipeline, a flow section of each tapered ring gradually tapers along an axial direction of the tapered ring, a length of the insertion sheet is greater than or equal to a total length of an arrangement of the tapered rings, and the flow section of the tapered ring of the backflow preventer gradually tapers along a forward movement direction of gas in the EGR pipeline.

8. The engine EGR system according to claim 7, further comprising an EGR valve provided in the EGR pipeline.

9. An engine EGR system, comprising an engine, an EGR pipeline, and an EGR cooler, wherein the EGR pipeline comprises an EGR main pipeline and a plurality of EGR gas intake pipes, the plurality of EGR gas intake pipes are in communication with a cylinder of the engine, two ends of the EGR main pipeline are respectively in communication with the plurality of EGR gas intake pipes and an intake pipeline of the engine, the EGR cooler is provided in the EGR main pipeline, and each of the EGR gas intake pipes is provided with a backflow preventer, the backflow preventer comprises a plurality of tapered rings provided in a pipeline, an outer edge of each of the plurality of tapered rings is connected to an inner wall of the pipeline, the plurality of tapered rings is arranged along an axial direction of the pipeline, and a flow section of each tapered ring gradually tapers along an axial direction of the tapered ring,
wherein the backflow preventer in the EGR main pipeline further comprises an insertion sheet, the insertion sheet is inserted into the plurality of tapered rings of the backflow preventer, a length of the insertion sheet is greater than or equal to a total length of an arrangement of the plurality of tapered rings, and the insertion sheet is extended to an intersection of the EGR gas intake pipes.

10. The engine EGR system according to claim 9, wherein a pipe section of the EGR main pipeline ahead of the EGR cooler is provided with the backflow preventer.

11. The engine EGR system according to claim 9, further comprising an EGR valve provided in the EGR main pipeline.

* * * * *